US007492915B2

(12) United States Patent
Jahnke

(10) Patent No.: US 7,492,915 B2
(45) Date of Patent: Feb. 17, 2009

(54) DYNAMIC SOUND SOURCE AND LISTENER POSITION BASED AUDIO RENDERING

(75) Inventor: Steven R. Jahnke, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 814 days.

(21) Appl. No.: 10/779,047

(22) Filed: Feb. 13, 2004

(65) Prior Publication Data

US 2005/0179701 A1 Aug. 18, 2005

(51) Int. Cl.
*H04B 1/00* (2006.01)

(52) U.S. Cl. ........................ 381/119; 381/306; 345/473

(58) Field of Classification Search ................. 381/119, 381/61, 306, 300, 1; 369/4; 700/94; 463/1; 345/619, 418, 440, 473, 441
See application file for complete search history.

(56) References Cited

U.S. PATENT DOCUMENTS 5,337,363 A * 8/1994 Platt ............................ 381/17
5,414,474 A * 5/1995 Kamada et al. ............. 348/700
5,574,824 A * 11/1996 Slyh et al. ................... 704/226
5,633,993 A * 5/1997 Redmann et al. ............ 345/419
6,266,517 B1 * 7/2001 Fitzpatrick et al. ....... 455/114.3

* cited by examiner

*Primary Examiner*—Vivian Chin
*Assistant Examiner*—Con P Tran
(74) *Attorney, Agent, or Firm*—Robert D. Marshall, Jr.; W. James Brady; Frederick J. Telecky, Jr.

(57) ABSTRACT

This invention describes the use of dynamic sound source and listener position (DSSLP) based audio rendering to achieve high quality audio effects using only a moderate amount of increased audio processing. Instead of modeling the audio system based on sound and listener position only, the properties that determine the final sound are determined by the change in listener relative position from the current state and last state. This storage of the previous state allows for the calculation of audio effects generated by change in relative position between all sound sources and listener positions.

5 Claims, 7 Drawing Sheets

DYNAMIC SOUND SOURCE AND LISTENER POSITION BASED AUDIO RENDERING

TECHNICAL FIELD OF THE INVENTION

The technical field of this invention is audio processing in computer games.

BACKGROUND OF THE INVENTION

Current video game systems hardware almost universally include a main processor and a graphics processor. The main processor may be a Pentium processor such as in a personal computer (PC). Alternatively, the main processor may be any processor involved in the transmission of program information to a graphics processor. The graphics processor is tightly coupled to the main processor by a very high performance bus with data throughput capability meeting or exceeding that of an Accelerated Graphics Port (AGP). The graphics is also generally coupled via an I/O bus providing an audio processor and includes network connectors for a PCI port. The main processor and graphics processor are tightly coupled to minimize any performance degradation that could accompany the transfer of data from the main processor and memory system to the graphics processor.

The audio system components are usually not viewed as performance critical. Hence the audio system usually resides on a lower performance peripheral bus. This is perfectly acceptable for the audio in current systems. Currently, the highest performing game audio systems have two chief characteristic features.

The first characteristic of high performance game systems is a positional audio scheme. A positional audio system performs dynamic channel gain/attenuation based on the user input and character perspective on a screen in real time. Multi-channel speaker systems typically include five main speakers, a front left, center, and front right speaker, plus a rear left and a rear right speaker. Such systems also include a separate subwoofer, which is a non-positional speaker for bass reproduction. Such an audio system with five main speakers and sub-woofer is referred to as a '5.1 level' system.

If a sound generating source is coming from the left of the on-screen camera position, the gains on the left speakers are increased for that sound. Similarly, the gains for the right side are attenuated. If the user moves the joystick and changes the relative camera position, the channel gains are dynamically modified. The positional audio algorithm will be enhanced in new designs to sound well on a living room quality multi-channel system.

The second characteristic component is a real time reverb. Real time reverb can be run, not mixed with the track but rendered during game play. This creates a sound field effect based on the user environment within the game. For example, if the game moves from an outdoor scene into a cavern, a cavern reverb is applied to all new game produced sounds. Thus a gun shot will have an echo since it is now inside the cavern instead of outside. Several competing game system providers employ this of technology.

Both the positional audio and the real time reverb enhancements require the game designer to create the desired effect at game create time. The effects are then applied during runtime by the audio processor. For example, a cavern hall effect must be added to the game code in the form of "when this level is loaded, apply the cavern effect." The game developer provides this effect which does not require a separate mixed track to be heard. The effect is produced as processing is applied, on the fundamental sound during run time. Thus a normal gunshot could be mixed for only the front left/right speakers.

Additionally, it is possible in a computer game to apply a different reverb to each sound primitive based on the sound source location. Suppose a sound comes from a cave but the listener position is outside the cave. The sound source will have the cave reverb applied, while any sound generated by the listener will not. These real-time effects must be set by the audio designer during the game create time by tagging the sound with the reverb to be applied.

In contrast to the moderate sophistication of current audio techniques, video techniques have advanced at a much more rapid pace. Video game manufacturers have committed ever increasing levels of hardware and software technology to the video image. Video information for game systems is assembled from elementary data and layered in levels to allow for image processing according to superposition principles. Increasing detail is supplied to the image with the inclusion of additional layer information. In a landscape scene, the lowest level is a wire-mesh structure that forms the spatial coordinates upon which objects may be placed. Higher levels contain polygon objects and yet higher levels contain refinements on the shapes of these objects such as rounding corners. With more levels the landscape scene and objects are further refined and shaped to:

1. Add texture to shapes taking them from stark geometrical figures to more realistic appearance;
2. Mix in reflective properties allowing reflective effects to be observed;
3. Modify lighting to add subtle illumination features;
4. Add perspective so that far away objects appear to be smaller in size;
5. Add depth of field so that position down into the image may be observed; and
6. Provide anti-aliasing to remove jagged edges from curves.

These are only a few basic features added in layers superimposed to form the finished image. The amount of image processing required to accomplish this refinement of the video data is enormous. The game starts from a suite of data describing polygons and their placement on a wire mesh as well as the characteristics of each polygon implicitly creating a video landscape to enable the processor to generate highly refined effects.

Multi-channel surround sound is becoming a standard function in gaming systems. Multi-channel surround sound enables a much wider array of effects than possible in a standard 2-speaker stereo system. Many standards and applications have been created that take advantage of this in modern game systems. Some of these support positional audio commonly referred to as 3D audio. Some apply various post-processing based effects to a base sound file for additional effects. Thus a reverb models the sound in a closed environment. These models allow a game developer on game creation, to pre-determine how a sound should be heard in a given environment. The game developer creates a single sound file. The sound levels on the multi-channel speaker system are adjusted via the positional audio application program interface (API) based on the relative position of the listener to the sound source. Various post processing effects such as a reverb can also be applied to a single sound source file in real-time based on the pre-programmed environment state information. This creates a better listening experience during game play.

However, all these models assume that the game environment itself is static. Although speaker levels can be dynamically adjusted, the sound properties cannot be adjusted unless pre-programmed before hand as described above. This creates a fairly large burden on the game designer to have enough audio knowledge to know what various effects are supposed to sound like in a given environment, particularly physics based effects. These models also so not use any information regarding changes in the sound environment, particularly the creation of multiple sound sources and how they interact with each other. In the static model, these effects must be predetermined upon game design.

Next generation game console audio requirements will fall into one of two major operational modes: Bit Stream Playback Operational Mode; and Game Operational Mode. Two game manufacturers have indicated that their next console will be more than a game system. These consoles will be a living room entertainment system. The key audio component in the current living room entertainment system is the audio-visual reproduction (AVR). The soon to be introduced consoles will need to support some AVR functionality. Direct un-amplified multi-channel audio out may be present.

SUMMARY OF THE INVENTION

This invention describes the use of dynamic sound source and listener position (DSSLP) based audio rendering to achieve high quality audio effects using only a moderate amount of increased audio processing. Instead of modeling the audio system based on only sound and listener position, the properties that control the final sound are determined by the change in listener relative position from the current state and previous state. This storage of the previous state allows for the calculation for change in relative position between all sound sources and listener position.

Current audio solutions allow for changes in positional audio by speaker gain adjustment in a multi-channel system in real-time. Other effects need to be determined at game design time, even if the effects are applied in real-time on a game source. How that effect should be does not change based on the game state. There is no consideration for change in relative position between a sound source and another sound source or listener position. In a dynamic model, this can be changed. For example, if two sounds start out close to the listener position, all frequency components are mixed. As the move away, only the lower frequencies need to be mixed, because this is how the sounds interact in the real world. A dynamic model beyond simple positional audio allows for this.

The present invention bases how the audio is modified on a change in relative position between sound sources and listener position instead of simply current position. This invention retains the previous sound state and physically models how the sound should be processed. This allows interaction between sounds to be dynamically determined.

With this dynamic model the game audio can now be physically modeled as to how the sound would actually be heard in a real world setting. Interactions between sounds and velocity dependent characteristics no longer need to be determined at the game create state. These are determined and applied real-time during game play.

With this invention it is easier for game designers to create a real-world sounding game without the need to be an audio expert. The game designer no longer needs to concern themselves with effects such as a Doppler shift or how the various interactions between sounds are supposed to sound like. These affects are automatically determined and applied by the dynamic model.

In this invention the audio model mirrors current 3D graphics rendering models. In current 3D graphics only the changes that occur in the image are calculated and applied. With the audio now employing a similar model, the mostly graphics oriented game designers can more easily grasp the audio model. Similar techniques and effects done for graphics such as dynamic lighting and shadowing are directly applicable to the audio as well.

BRIEF DESCRIPTION OF THE DRAWINGS

These and other aspects of this invention are illustrated in the drawings, in which.

DETAILED DESCRIPTION OF PREFERRED EMBODIMENTS

Currently audio processing carries much lower processing priority than video processing in computer games. Usually a basic point source sound is converted to digital audio and is modified to take on character of the general environment. For example a gunshot in an auditorium takes on a different character from the same gunshot in a padded cell. The game system programmer provides the basic sounds and their basic modifications that may be switched in depending on the environment. Presently employed audio technologies provide some effect processing done in real time, but statically applied with the core information hand inserted by a game designer during game create. This is analogous to primitive 2D graphics where an artist creates the environment and the game merely loads it and displays it.

In these current game audio schemes, the game designer predetermines what effects should be applied. These effects then are applied in real-time during game play. The audio engine does not need to know what the actual environment is. These currently available games insert audio effects on an object-per-object basis. For example, a door will have an acoustic property causing the current audio engines to apply a real-time occlusion effect if the designer says add occlusion.

Figure 1:
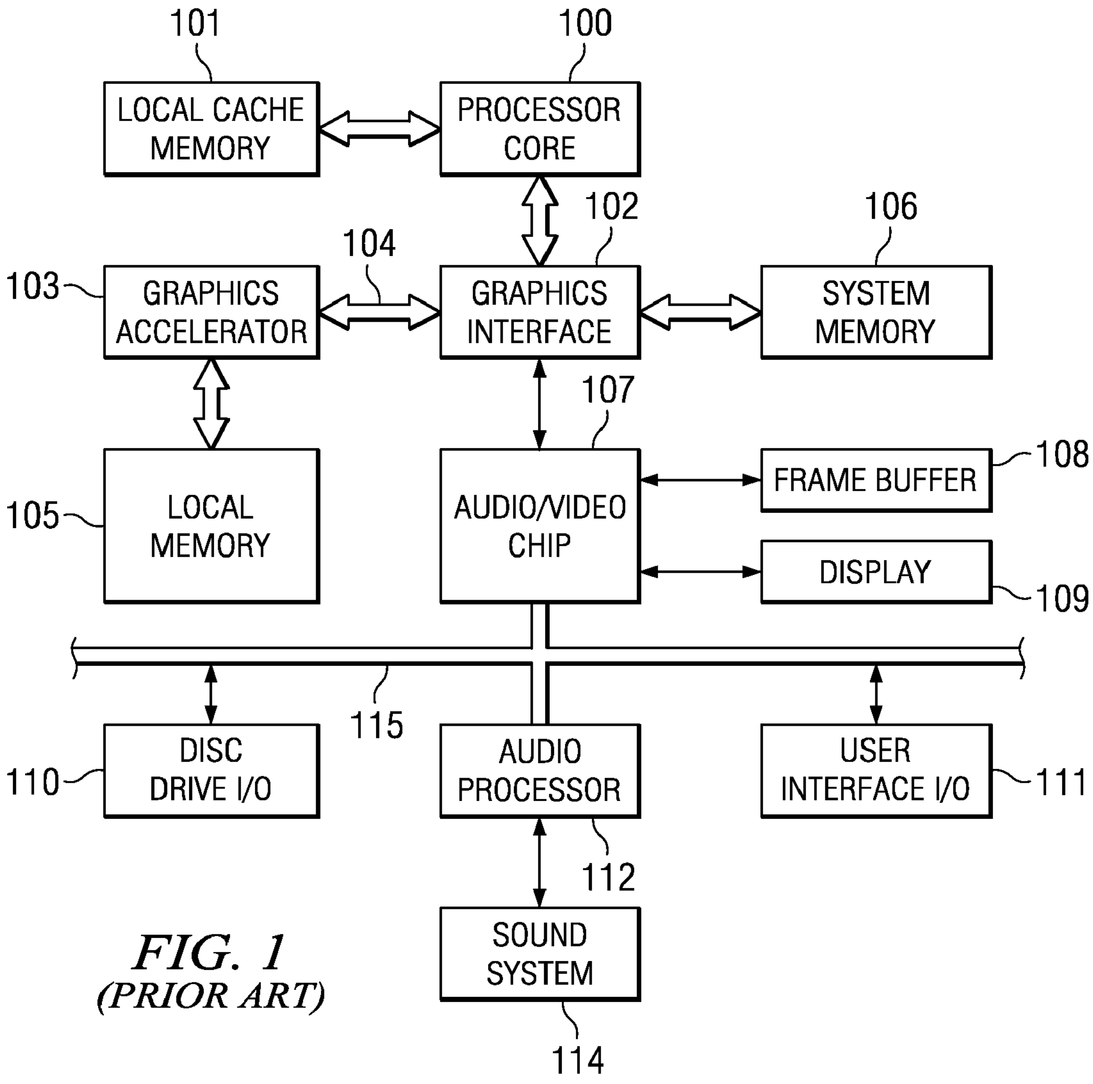
FIG. 1 (PRIOR ART)
FIG. 1 illustrates a conventional video game system architecture including a graphics accelerator interconnected via a high performance bus and a lower performance bus for non-video data transfer (Prior Art)

FIG. 1 illustrates the hardware architecture currently used in game systems of high quality. The processor core 100 is tightly connected to a local cache memory 101 and a graphics interface chip 102. Graphics interface chip 102 communicates with graphics accelerator 103 via a high speed bus 104. Graphics accelerator 103 draws control and program data from local graphics memory 105. System memory 106 provides bulk storage. Audio/video chip 107 completes the video processing by formatting into frames in frame buffer 108 for output to display 109. Peripheral bus 115 is a lower performance bus designed to interface to audio processor 112 and to disc I/O 110 and user interface I/O block 111. Sound system 114 provides the composite sound output generated by the audio processor 112.

The architecture of FIG. 1 provides exceptionally intense graphics computation power to ensure the graphics quality game players expect from current games. Audio effects, while occupying a place of great importance cannot claim the hardware and software complexity invested in the video generation. Usually the game designer adds audio enhancement as a modifying affect. These canned audio effects suffice where similar video type effects are clearly ruled out.

Current game console audio generally consist of tone generation using a summation of sine waves. Personal computer game audio, although generally played back as a wave file, is also created using tone generation. This is easy on the audio engineer because there is no need to record sound effects. It is simple on the audio processor. However, it generally lacks quality, depth and typically sounds artificial. On a home theater system the audio experience of these games is noticeably poorer than watching a digital video disc (DVD). Recorded sound effects employed by movie makers are much richer since they come from the natural world sounds. As a result, in order to have a DVD or even near-DVD like audio experience during game play, the audio engine must support the playback of files that have already been recorded, not simply generate a tone based on a series of sine wave parameters. This type of audio processing requires an AVR like processing stream such as illustrated in FIG. 2.

Figure 2:
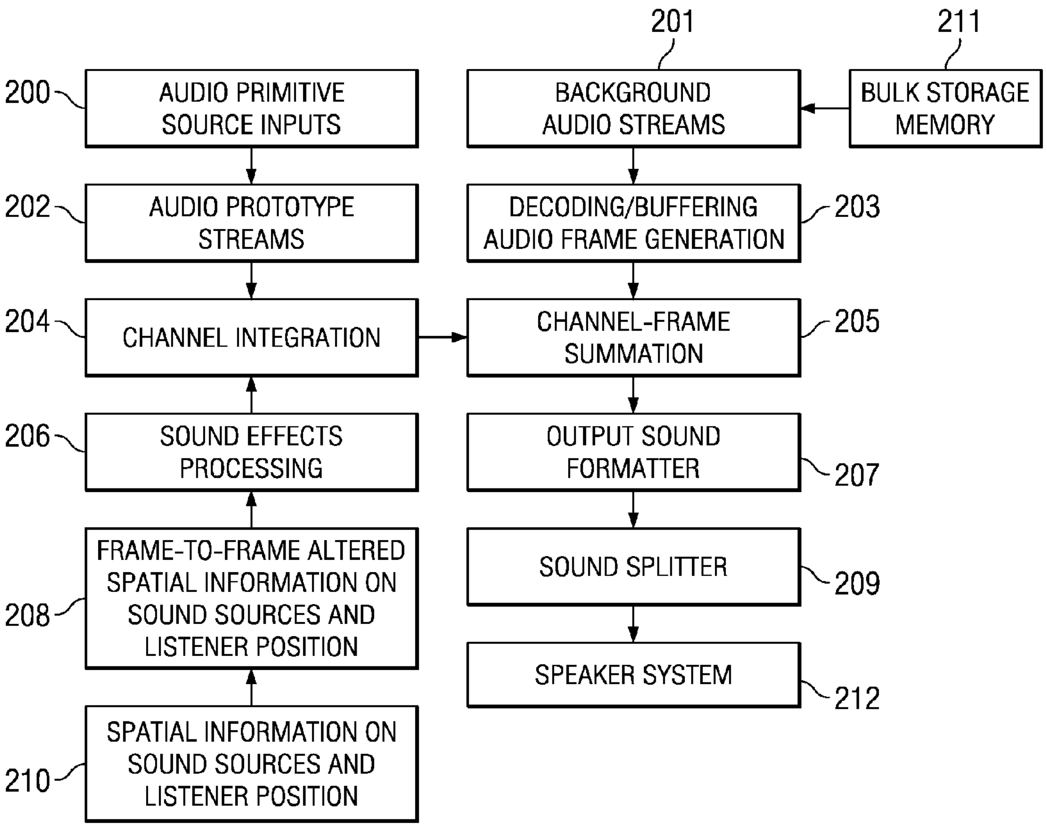
FIG. 2 (PRIOR ART)
FIG. 2 illustrates the software flow for game operational mode audio processor system (Prior Art)

FIG. 2 illustrates the two fundamental types of audio streams: (a) background audio streams 201; and (b) audio primitive streams 202. A typical game uses a background audio stream and a variable number of primitive audio streams. The background audio streams are limited by the amount of on-chip buffer static random access memory (SRAM) and the number of different sounds the human ear can pick out without it sounding like noise. Background audio and audio primitives are mixed in a CHANNEL/FRAME summation block 205 to create the final output.

The background music is stored in bulk storage memory 211 (hard drive or CD) and is non-interactive. It is created and played back like a conventional compact disc or movie track. Because of their size, these background audio streams 201 are streamed into the audio processor either from the hard drive or from the game program CD. The audio decoder/buffer and audio frame generator 203 decodes this audio data like any normal input stream. The computer game typically supports all input stream file formats and sampling rates in the "Bit Stream Playback Operational Mode." This includes support for AC3, DTS and other commonly used formats. No effect processing, such as positional audio and environmental effect audio, is applied to the background music.

The audio primitives are interactive. FIG. 2 illustrates audio primitive source inputs 200. The first frame of each audio primitive must be stored in on-chip memory and then can be streamed in as audio prototype streams 202. All sound effect processing 206, both the positional audio and environmental effect audio, is applied directly to the audio primitives. The environmental effect applied is based on the sound source environment location. A global environmental effect is applied by the sound effects processing block 206, passed to the channel integration block 204 and then to the channel/frame summation block 205 where the mixed audio primitives are combined. This global environmental effect is based on the listener position relative to where the sound source is generated from spatial information block 210. This global environment is sensed on a frame-by-frame basis in frame-to-frame altered spatial information block 208. Output sound formatter 207 generates the composite sound for the system speakers. Sound splitter 209 performs the separation of this composite sound into its speaker specific sound. Speaker system 212 receives the multiple channels of sound to be produced.

Each audio primitive introduced in the audio primitive source block 200 has an associated active flag with it. If the flag is set, the audio primitive is active and played back a single time. Each active flag also has an associated self-clear or user-clear flag. If the self-clear flag is set, then the audio engine will automatically clear the previously active flag to inactive and trigger a change in audio state event. This audio primitive will execute once. If the self-clear flag is cleared to inactive, then the audio primitive active flag will remain set to active. This audio primitive will loop on itself and repeat until the game program tells the audio engine to clear the active flag to inactive. This is useful, for example, to propagate the constant hum of a car or plane engine.

In this invention, the audio system models sound and listener relative position only and the properties that determine the final sound are determined by the change in listener relative position from the previous state to the current state. This is a fundamental shift in the way audio is processed. This methodology allows for the determination of final sound based on a true physical model that is applied at run time, as opposed to being statically determined on game design.

To determine change in relative position when the next sound state is to be determined, the current x, y (and perhaps z) coordinates of all sound producing objects are stored, along with the listener position. This listener position is usually the object the camera position is focused on in a second or third person view game or simply camera position in a first person view game. This could be at the same rate as the graphics state is determined. This storage of previous state dynamically calculated. In the current static model, the audio designer must determine ahead of time that a Doppler shift needs to be applied. In this dynamic model, the audio engine software determines if and how much Doppler shift to apply. When mixing the interaction of sounds, physical distance affects which frequency components need to be mixed. In the static model, this has to be determined at the game design time. In a dynamic model, this can be changed. For example, if two sounds start out close to the listener position, all frequency components are mixed. As the objects move away, only the lower frequencies need to be mixed, as this is how the sounds interact in the real world. After calculating the change in state information, effects such as a Doppler shift can now be made based on the change in relative position between all sound sources and listener position. A dynamic model allows for this.

Current audio solutions allow for changes in positional audio, such as speaker gain adjustment in a multi-channel system, in real-time. Other effects need to be determined upon game design, even if the effects are applied in real-time on a game source. The rendering of the effect can not change based on the game state. There is no consideration for change in relative position between two sound sources or listener position.

The solution of the present invention modifies the audio based on a change in relative position between sound sources and listener position instead of merely their current positions. Retention of the previous sound state permits physically modeling of the sound. This permits interaction between sounds to be dynamically determined. The game audio can now be physically modeled according to how the sound would actually be heard in a real-world setting. Interactions between sounds and velocity dependent characteristics such as Doppler shift no longer need to be determined upon game creation. Instead these effects are determined and applied in real-time during game play.

Another benefit is that it is now easier for the game designer to create a real-world sounding game without being an audio expert. The game no longer needs to consider physical effects or the various interactions between sounds. These effects are automatically determined and applied in this dynamic model.

The basic game operational mode requirements as applied in this invention are essentially be the same as a PC audio system of today, but enhanced to generate quality sound on a home theater system. Two main base audio functions will be included in next generation consoles: positional audio; and real-time environmental effects.

The positional audio algorithm makes use of three key properties:

1. A listener position. This is generally the center of the camera view, that is how the gamer sees the game. There is only one listener position. The position of all sound producing sources is localized. There can be multiple sound producing sources that may be triggered at the same time.

2. A sound producing source is an object with an attached sound primitive. An example is a gun shot sound primitive tied to a game character shooting a gun.

3. The distance and orientation of the listener position and the sound producing object during a change in the sound state. This key trigger to the positional audio algorithm is described below.

During game creation, each audio primitive has an associated audio producing object. The same audio producing object may be associated with multiple audio primitives. Each audio producing object has a position in X, Y, Z space. The listener position is always normalized to (0,0,0) in X, Y, Z space for the purposes of the algorithm. When the audio producing object is initially loaded into the game consoles memory, its initial position relative to the listener position in X, Y, Z space is passed to the audio engine.

Four events may change the audio state. They are:

1. The gamer may change the relative listener position by using the joystick or other input device;

2. The gamer may trigger the playback of an audio primitive by hitting a button or other input action;

3. The game program may change the relative sound source position by moving the sound source objects; and 4. The game program may trigger the playback of an audio primitive.

During a change in audio state, the main processor will send an indication of the change in audio state event to the audio engine. This is based on the following:

1. If the change in sound state was driven by the gamer changing the listener position, then the input information, such as pulled back by amount, is passed to the audio engine. The audio engine then changes all the sound source producing object locations by this relative amount keeping the listener position normalized to (0,0,0).

2. If the change in sound state is driven by the game program changing the sound producing object locations, then only that change in the sound producing object location is transmitted. The audio engine changes its relative position in X, Y, Z space.

3. If the change in sound state is caused either by the user or the game program adding or removing an active sound primitive, the active state flag for the sound primitive is either set or cleared.

Figure 3:
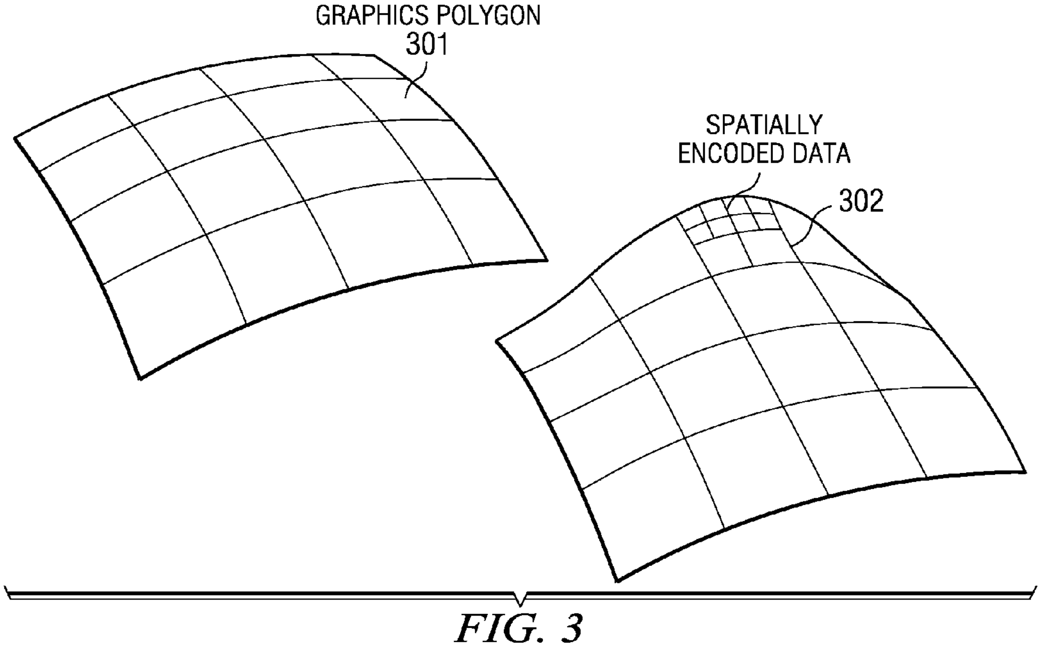
FIG. 3 illustrates a 3D object with an acoustic tag.

This positional audio algorithm is event driven. The positional audio effect engine responds to any change in the audio state. The sound source primitives are assumed to be mixed as if the sound is directly in front and at full peak (i.e. distance is zero) to the listener position. This can be either 2-channel PCM or a multi-channel source. FIG. 3 illustrates a generic graphics polygon mesh 301. Polygon mesh 302 may have encoded data connected spatially with a specific polygon 302 in the mesh.

Figure 4:
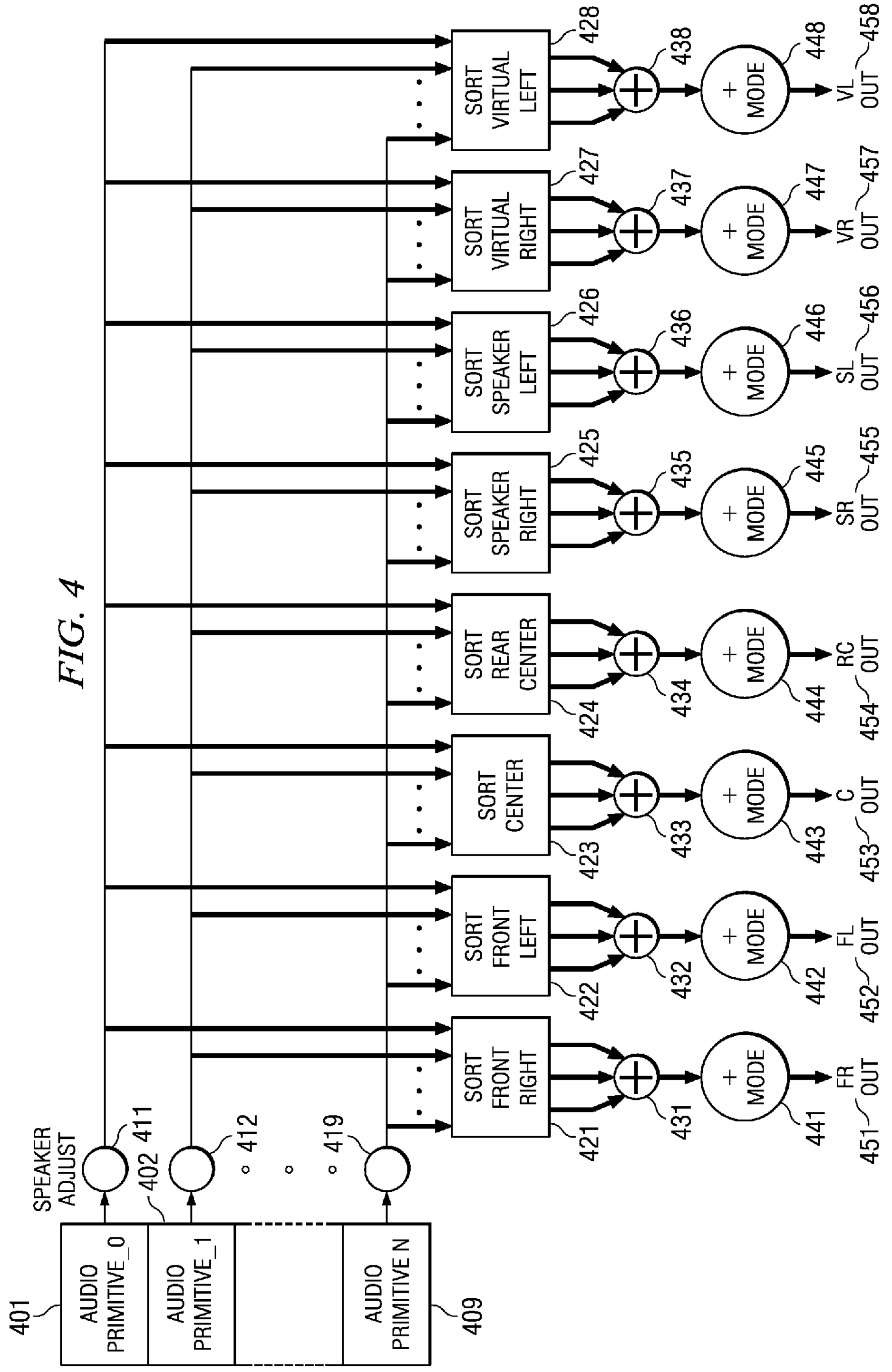
FIG. 4 illustrates the block diagram for positional audio effect engine processing.
Figure 6:
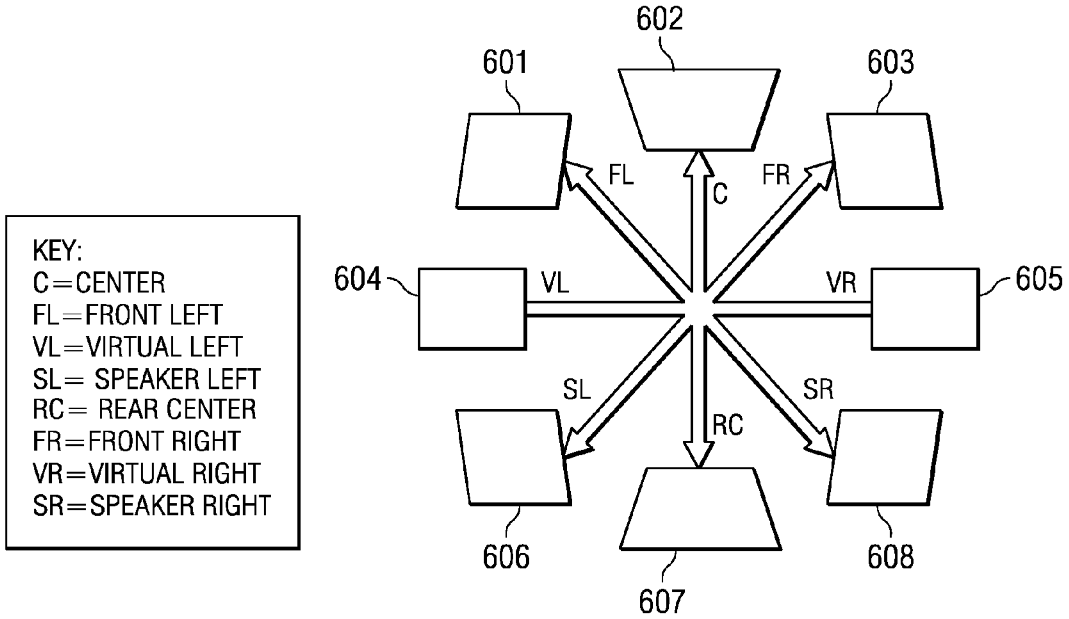
FIG. 6 illustrates the relative game state sound-to-listener orientation to speaker configuration mapping.

The audio engine runs once at the initialization of the sound audio state, and then any time there is a change in the audio state. FIG. 4 illustrates a flow chart for the engine. FIG. 4 illustrates the fundamental relationship between the game state audio primitives and the manner in which they map to speaker positions. Audio primitives are represented in blocks 401 to 409. Speaker adjust pre-processing blocks 411 to 419 prepare the primitives for distribution into the eight channels of output sound 451 to through 458. Sort blocks 421 to 428 perform sorting of the multi-channel primitives prior to summation in blocks 431 to 438. The sort summations undergo mode modification effects in blocks 441 to 448. Outputs 451 to 458 represent the resulting eight-channel sound. These are the final digital value to send to each speaker location. This configuration assumes eight speaker locations for the purpose of determining how to perform speaker adjust, with each speaker equally distant from each other speaker and from the listener position. FIG. 6 illustrates these speaker locations.

Figure 5:
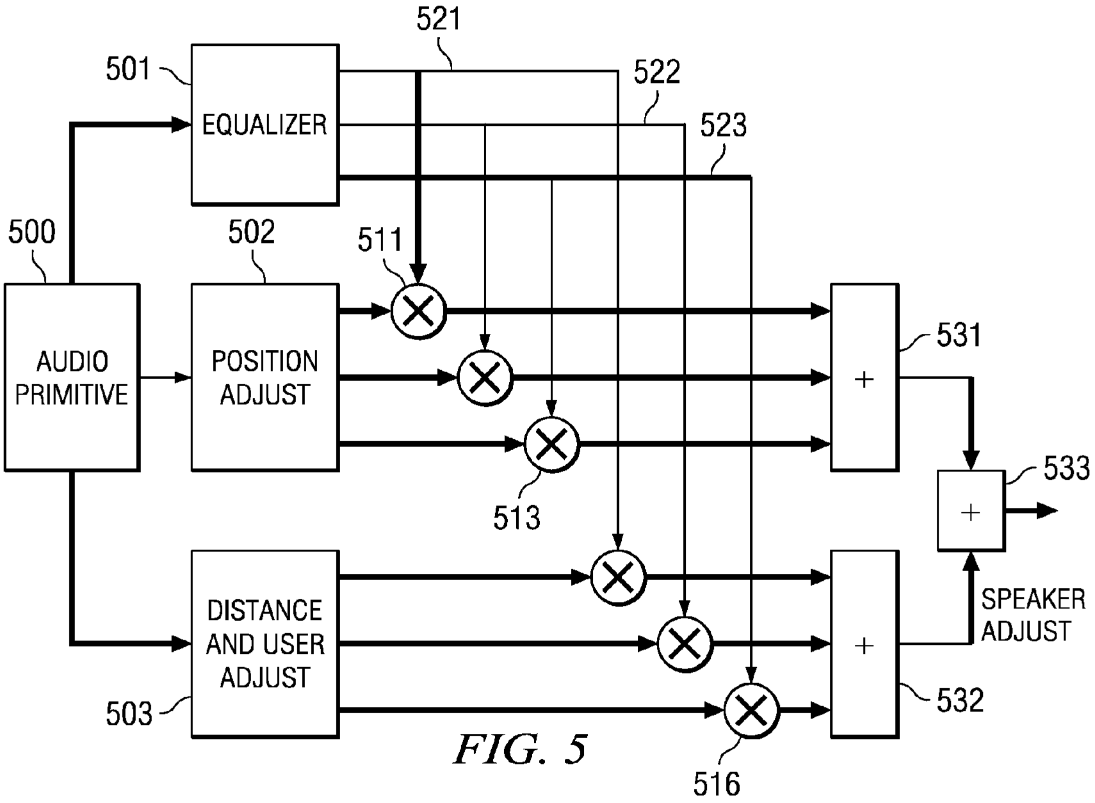
FIG. 5 illustrates a flow chart describing the fundamental relationships between game state audio primitives.

FIG. 5 illustrates an overview of an example speaker adjust block 411. A 3-band equalizer 501 runs on each active audio primitive denoted by block 500. This separates each primitive into its low frequency band 521, mid-frequency band 522, and high frequency band 523. Equalizer 501 performs a relative game state sound-to-listener orientation to drive speaker configuration mapping.

Position adjust block 502 performs the a adjust calculations of equations 4 and 5 below. Position adjust block 502 computes the individual gain adjustments for originating speakers $\alpha_1$ and $\alpha_2$ and for remaining channels of non-originating speakers s according to equations 9, 10, 11 below. The distance adjust portion of block 503 computes $\rho$ for equation 3 and completes the calculation of $G_d$ as given in equation 12 below. The user adjust portion of block 503 establishes the value of the parameter U. U is the user adjust value having a default value of 1. U allows the game designer to adjust how distant a sound should be in a given game. Thus U causes the game to have an up close sensation or a far away sensation. Both the positional and distance attenuation factors are applied for all active sound primitives. Product elements 511 through 516 represent the multiply operations of equations 9, 10, and 11. The default speaker configuration is a 6.1 system. In a 7.1 channel configuration, the two back speakers act as one. Two summation stages include summation blocks 531 and 532 for the first stage and summation block 533 for the final stage.

FIG. 6 illustrates the model case for determining how the game state volume control and mixing should occur. The model of FIG. 6 forms the foundation of the positional audio algorithm. The key in FIG. 6 lists the labels for each speaker. FIG. 6 illustrates the ideal model locations of speakers 601 to 608. The AVR manufacturer generally determines how the speakers are actually set up in a home. In the case of using a powered speaker system directly with the game console, the audio settings of the Bit Stream Playback Operational Mode control.

Although the physical speaker system is assumed to be a default 6.1, the audio algorithm assumes the eight speaker positions illustrated in the FIG. 6. The virtual left VL 604 and virtual right VR 605 speaker audio signals are generated using the front and surround left and front and surround right speakers information and computed from equations 1 and 2.

$$VL=0.707SL+0.707FL \quad [1]$$

$$VR=0.707SR+0.707FR \quad [2]$$

This gives the equivalent loudness to the listener as if an actual speaker were at the virtual locations with no attenuation. Other game state positions are calculated using polar coordinates, ρ for distance and θ for angle. These polar coordinates are calculated from the angle and magnitude of the x and y coordinates of each position. Converting the x and y coordinates of each primitive into polar form significantly reduces the computational effort to follow. It is possible to apply this calculation in the audio development tool prior to down loading the x and y coordinates to reduce a computation step by the DSP. The distance value ρ must be kept between 0.0 and 1.0. In this model 1.0 is the listener position, and 0.0 is where sound is no longer heard. Therefore, x and y must be normalized prior to calculating ρ in the development tool. The polar coordinates conversion is calculated using equations 3A and 3B.

$$\rho = 1 - \sqrt{x_n^2 + y_n^2} \quad [3A]$$

$$\theta = \arctan\frac{y_n}{x_n} \quad [3B]$$

Where $x_n$ and $y_n$ are the normalized Cartesian (X, Y) coordinates. Once ρ and θ are calculated for each primitive, an attenuation value is calculated for each speaker for each of the low frequency, mid-frequency, and high frequency bands. This maps sound primitive to the appropriate two speakers where sound should originate. If the sound source location is directly on the Y-axis (x=0), then the sound originates from the front left and right speakers and the center speaker or the surround left and right speakers and rear speaker. Otherwise, the sound primitive originates from no more than two speakers. These originating effect speakers are now the relative main speakers for the sound primitive.

Once the two speakers for the originating effect are determined, two alpha adjustments $\alpha_1$ and $\alpha_2$ are applied to the two speakers. The values of $\alpha_1$ and $\alpha_2$ are calculated by equations 4 and 5.

$$\alpha_1 = \left|\frac{L_1 - \theta}{\pi}\right| \quad [4]$$

$$\alpha_2 = \left|\frac{L_2 - \theta}{\pi}\right| \quad [5]$$

The speaker attenuation for all the remaining speakers is dependent upon the frequency component. These attenuation adjustments can be made according to equations 6, 7, and 8.

$$G_L=-6dB \quad [6]$$

$$G_M=-12dB \quad [7]$$

$$G_H=-18dB \quad [8]$$

where the subscripts L, M, and H signify the low frequency, mid-frequency, and high frequency ranges respectively.

The two originating speakers are attenuated by the values given in equations 9 and 10.

$$G_{1\alpha}=G_f\alpha_1 \quad [9]$$

$$G_{2\alpha}=G_f\alpha_2 \quad [10]$$

Equations 4 and 5 determine the weighting ranging between 0 and 1 of attenuation to apply to the two originating speakers. This weighting is determined by relative position between these speakers. Equations 9 and 10 illustrate using this weighting to determine how much of each of the frequency dependent gain from equations 6, 7, 8 to apply. $G_f$ represents gain within the frequency range.

The attenuation of remaining channels $G_{s\alpha}$ is determined by:

$$G_{s\alpha}=G_f \quad [11]$$

Where the s subscript represents the remaining non-originating speakers. This attenuation is for the positional characteristics only. Once the positional attenuation is computed, the distance ρ attenuation is applied. The distance attenuations for each of the two originating speakers is:

$$G_d=G_f\rho U \quad [12]$$

Where U is the user adjust, whose default value is 1. This allows the game designer to adjust how far sound should be in a given game. This determines whether the game has an up close feel or a far away feel. Both the positional and distance attenuation factors are applied for all active sound primitives.

$$V_{1p}={}_{L,M,H}G_{1\alpha}+{}_{L,M,H}G_d \quad [13]$$

$$V_{2p}={}_{L,M,H}G_{2\alpha}+{}_{L,M,H}G_d \quad [14]$$

$$V_{sp}={}_{L,M,H}G_{s\alpha} \quad [15]$$

Following calculation of active sound primitives volume output for each speaker, they are sorted from highest to lowest. Each speaker output is then summed up to a total of 0 dB. Once 0 dB is reached, any lower volume primitives are discarded for that speaker to prevent clipping.

In summary, the game state volume adjustment due to the positional audio algorithm is:

$$V_{nV}=V_{np}0 \quad [16]$$

The final mix with the background music also has this volume restriction. Once the total primitive speaker volumes are calculated, the remaining volume headroom is used as an attenuation value for the background music. This attenuation value is calculated as follows:

$$G_{Mn}=0-V_{nV} \quad [17]$$

where the n subscript identifies the speaker location in question.

The music mix for each speaker is then attenuated by this value. The final attenuated music mix and primitive mix is the final mix used to the speakers. Therefore:

$$V_{1T}=V_{1V}+G_{M1} \quad [18]$$

$$V_{2T}=V_{2V}+G_{M2} \quad [19]$$

$$V_{sT}=V_{sV}+G_{Ms} \quad [20]$$

Figure 7:
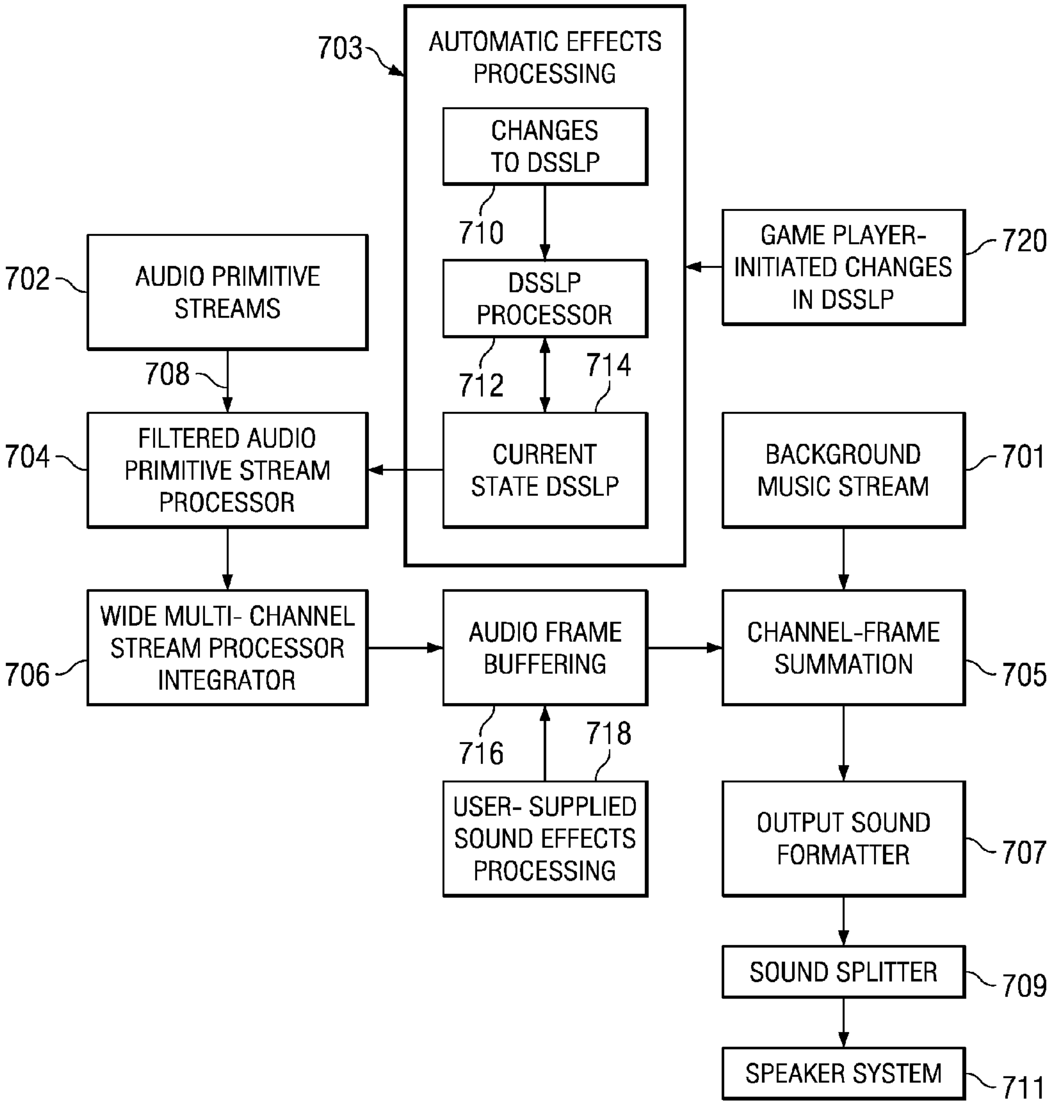
FIG. 7 illustrates the software flow for the dynamic sound source and listener based audio rendering of this invention.

FIG. 7 illustrates the two fundamental types of audio streams: background music streams 701; and audio primitive streams 702. In a typical game, the background music stream and a variable number of audio primitive streams are processed and then mixed in the channel frame summation block 705 to create the final output. The audio primitive streams are limited by the amount of on-chip storage available and the number of different sounds the human ear can discern as different from the interference of surrounding noise.

The background music stream 701 is stored in bulk memory such as hard drive or CD. Background music stream is non-interactive. It is created and played back like a conventional compact disc or movie sound track. Because of the size of this file, the track will be streamed into the audio processor either from the computer hard drive or the game CD. All input stream file formats and sampling rates that are supported in the Bit Stream Playback Operational Mode can be supported including AC3, DTS and other commonly used formats. The audio processor applies no effect processing directly to the background music.

Audio primitive streams 702 are interactive. The first frame of each audio primitive must be stored in on-chip memory. The audio primitive data may then streamed in on available S/PDIF inputs 708 to filtered audio stream processor block 704. S/PDIF is the bus of choice even for a closed system, because it most mirrors an AVR system. However, these streams could be fed into the audio processor in a number of different ways. Supported file formats and sample rates are the same as the background music. Most will be simply two-channel PCM files. Longer duration primitives or those primitives requiring a more full experience may be multichannel encoded using an industry standard format.

Automatic effects processing 703 for audio primitive streams includes compiling changes to DSSLP state from game player initiated changes 720 to source and listener positions. Block 710 continuously updates this dynamically altered DSSLP data passes it to DSSLP processor 712. DSSLP processor 712 generates the current state DSSLP, which is stored in block 714. This current state DSSLP data is used to configure the digital filters of block 704 as required to process the audio primitive streams 702. Processor block 704 applies the required filtering to the audio primitive stream.

These filtering effects are accomplished within the audio rendering blocks contained within a wide multi-channel stream processor integrator 706. User supplied sound effects processing can be applied by block 718 to the audio primitive output stream and combined in audio frame buffering block 716. The fully processed mixed audio stream is passed to the channel/frame summation block 705. Channel/frame summation block 705 mixes the audio primitives and background music streams.

Each audio primitive introduced into the filtered audio primitive stream processor block 704 has an audio primitive stream processor with an associated active flag. If the flag is set, the audio primitive is active and played back a single time. Each active flag also has an associated self-clear or user-clear flag. If the self-clear flag is active, then the audio engine will automatically clear the previously active flag to inactive and trigger a change in audio state event. If the self-clear flag is inactive, then the audio primitive active flag will remain set to active. This causes the sound primitive to loop on itself until the game program tells the audio engine to clear to change its active flag to inactive. This is useful to propagate the constant hum of a car or plane engine.

As described earlier in reference to FIG. 2, the output from the channel/frame summation block 705 is passed to the sound formatter 707. Sound formatter 707 generates the composite sound for the system speakers and the sound splitter 709. Sound splitter 709 in turn performs the separation of this composite sound into its speaker specific sound. The speaker system block 711 receives the multiple channels of sound to be produced.

Figure 8:
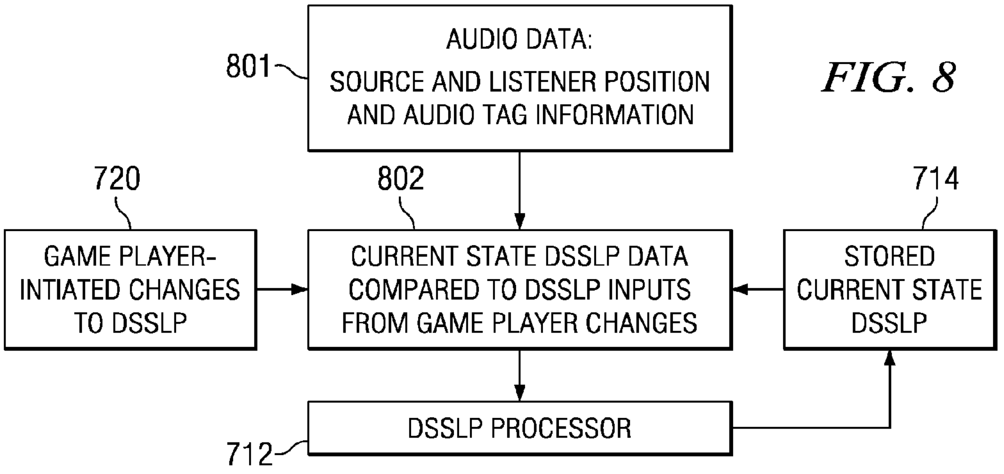
FIG. 8 illustrates the automatic effects processing portion of the 3D rendering audio processor system of this invention.

FIG. 8 illustrates the automatic effects processing portion of the 3D rendering audio processor system of this invention. Audio data inputs from block 801 include a list of all source sound and listener positions and audio tag information. Block 802 generates the current state DSSLP data from the stored current state DSSLP of block 714 and the game player initiated changes to DSSLP input of block 720. Block 802 processes the DSSLP data to generate in the DSSLP processor 712 a dynamically changing stored DSSLP configuration that determines the proper filtering of sound emanating from each of the audio source locations. The DSSLP processor 712 also relates the position of each listener relative to each speaker location. Finally the current state DSSLP data is stored in block 714 for use in the real-time rendering computations. This intensive real-time rendering computation is performed in the Filtered Audio Primitive Stream Processor 704 of FIG. 7.

Figure 9:
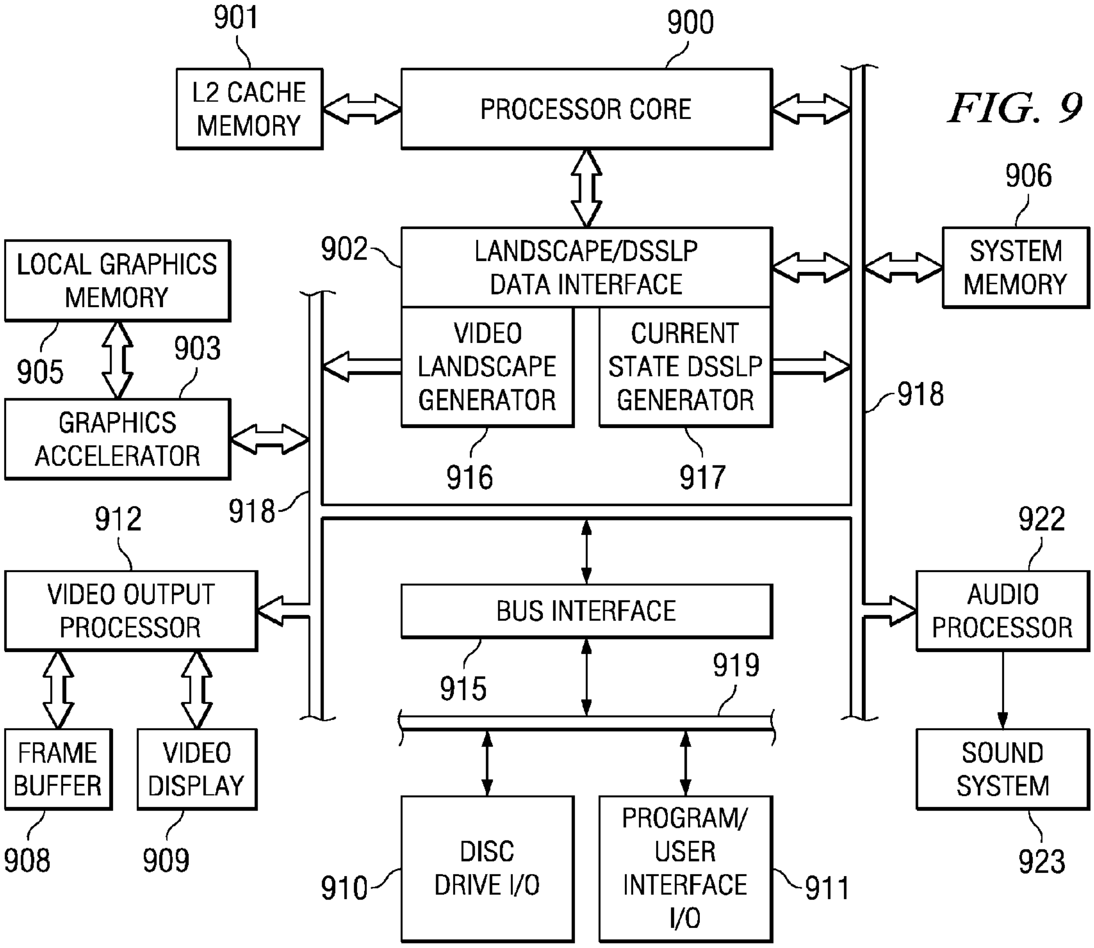
FIG. 9 illustrates the advanced audio/video processor required for dynamic sound source and listener based audio rendering as described in this invention.

FIG. 9 illustrates the game architectural and bus changes required to implement a newer high performance bus system to provide for the DSSLP technology. The video and audio portions of the architecture are on more equal footing. Processor core 900 is driven from control information stored in cache memory 901. Processor core 900 and several other key elements reside on a high performance bus 918. Processor core 900 interfaces directly with landscape/DSSLP data interface 902 generating a complete description of both the video landscape 916 and the current state DSSLP information 917. The real-time updated description of the DSSLP current state allows for real-time rendering of audio effects.

The real-time graphics processing employs graphics accelerator 903 and associated local graphics memory 905. Video output processor 912 uses the generated data to drive the frame buffer 908 and the video display block 909. Audio processor 922 employs system memory 906 storing previous state DSSLP information and generates new current state DSSLP audio information stored in current state DSSLP generator 917. Real-time audio processor 922 in turn drives the sound system 923.

The system also includes a peripheral bus 919 having lesser performance than high performance bus 918 to interface with disc drive I/O 910 and program/user interface I/O 911. Bus interface 915 provides interface and arbitration between the high performance bus 918 and the peripheral bus 919.

Yet another benefit of this invention is that this model mirrors current 3D graphics rendering models. In these graphics rendering models only the changes that occur in the image are calculated and applied. Thus the mostly graphics oriented game designers can more easily grasp the audio model. Similar techniques and effects done for graphics (such as dynamic lighting and shadowing) are thus directly applicable to the audio. The following example illustrates the difference in the approach of the present invention to that of current technology in generating Doppler effects in the audio system.

A Doppler shift is implemented in current technology through hard coded programming. The programmer simply passes a Doppler shift parameter, which is handled by the main processor and not an audio processor. The main processor is responsible for the positional audio algorithms. The audio processor in current systems is only an effect processor. The audio processor carries out the basic audio stream modifications (e.g. reverb, volume control) determined by the main processor. A Doppler shift requires the following steps.

The game designer operates from a programming level and passes a Doppler value in the frequency domain to the main processor. The main processor passes this Doppler value and other information to the audio processor. This other information includes: (a) new positional updates; (b) new tone synthesized patterns; and (c) reverb filter coefficient table pointers. The audio processor takes the data from the main processor and applies effects. For a Doppler effect the audio processor time shifts samples a number of samples related to the received Doppler value. Thus programmer determines how the Doppler should sound in a given state. The audio processor has no role in determining what the Doppler value should be but merely generates the effect. Furthermore, no interaction occurs between what the prior position and the current position in determining Doppler value.

Figure 10:
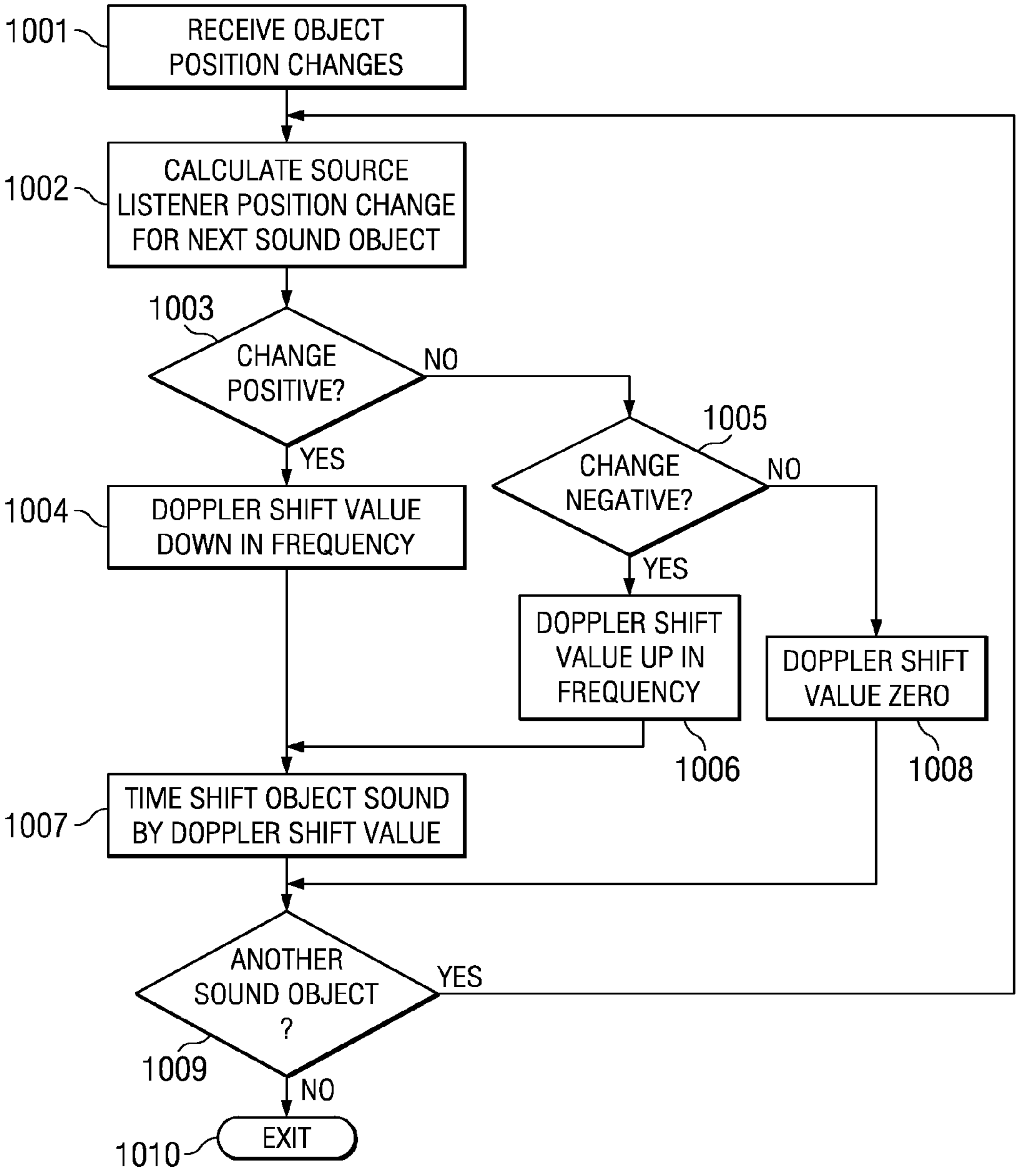
FIG. 10 is a flow chart illustrating the application of Doppler shift effects according to this invention.

FIG. 10 illustrates a flow chart of the Doppler shift process in the present invention. The audio processor periodically calculates and applies a Doppler effect to each active sound object. The audio processor receives object position change information from main processor (step 1001). These position changes could be as a result of user input or as a result of motion of a computer controlled object or a combination. The audio processor determines position, what effects to apply and then applies them. This process begins by calculating from the object change information the change in source listener position distance and direction for the next sound source object (step 1002). This process includes calculating the new position of each object from the inputs. Each new position is compared with the stored previous position for that object to determine any change. For the first time through this loop the next object is the first object. If the change in position is positive (Yes at decision block 1003) indicating the sound source is moving away relative to the listener position, then the Doppler shift value is down in frequency (block 1004). This negative Doppler shift value is proportional to the amount of distance change. If the change in position is negative (No at decision block 1003 and Yes at decision block 1005) indicating the sound source is approaching the listener position, then the Doppler shift value is up in frequency (block 1006). This positive Doppler shift value is also proportional to the amount of distance change. The sound from the corresponding sound source object is time shifted by an amount and direction corresponding to the Doppler shift value (block 1007) for the next period. The audio processor implements the Doppler shift by time shifting samples in the frequency domain. This creates an audible frequency shift in the sound. If the change is neither positive nor negative (No at decision block 1003 and NO at decision block 1005, no Doppler shift is required. The Doppler shift value is set to zero (block 1008) and the time shift block 1007 is bypassed. If there is another active sound object (Yes at decision block 1009), then control returns to block 1002 to repeat for this next object. If there not another active sound object (No at decision block 1009), the Doppler shift process is compete (exit block 1010).

This programming is dynamic and based only upon user inputs from the main processor. The main processor passes the object position change information to the audio processor. The audio processor stores the state of current audio producing objects and their prior states. The audio processor determines the value of the Doppler effect and applies it as detailed in FIG. 10. If the Doppler shift value is positive, then sound is moving away relative to the listening position. If the Doppler shift value is negative, then sound is getting near. The magnitude of the Doppler shift value is the amount of frequency shift to apply. This value sets the number of samples to time shift either positively or negatively depending on the relative motion.

Thus the audio engine determines autonomously the relative change in sound source and listener position amount and direction, then time shifts the audio samples appropriately. The programmer is not required to intervene to cause the Doppler effect. This is analogous to automatic shading in a 3D graphics processor. The graphic artist never draws a shadow. The main processor automatically generates the shadow based on light source, camera position and object.

What is claimed is:

1. A method of sound processing to be used in systems utilizing computer generated graphics objects comprising the steps of:

defining plural sound sources, each sound source attached to a computer generated graphics object;

determining relative position between each computer generated graphics object with an attached sound source and a listener position including defining the location of each computer generated graphics object with an attached sound source in (X,Y) coordinates;

normalizing the defined locations (X,Y) coordinates to the listener position as coordinate origin;

converting the normalized defined locations from (X,Y) coordinates to polar coordinates;

mixing the sound sources into channels of multi-channel sound dependent upon relative position;

detecting changes in the relative position between each computer generated graphics object with an attached sound source and the listener position; and re-mixing the sound source into channels of multi-channel sound dependent upon the detected changes in relative position.

2. The method of claim 1 wherein:

said step of detecting changes in relative position between a computer generated graphics object with an attached sound source and the listener position includes conversion of object relative change in normalized (X,Y) coordinates to polar coordinates.

3. A method of sound processing to be used in systems utilizing computer generated graphics objects comprising the steps of:

defining plural sound sources, each sound source attached to a computer generated graphics object;

determining relative position between each computer generated graphics object with an attached sound source and a listener position;

mixing the sound sources into channels of multi-channel sound dependent upon relative position;

detecting changes in the relative position between each computer generated graphics object with an attached sound source and the listener position; and re-mixing the sound source into channels of multi-channel sound dependent upon the detected changes in relative position;

wherein said steps of mixing and re-mixing the sound sources into channels of multi-channel sound includes attenuating sound sources dependent upon initial sound level and distance from the listener position.

4. A method of sound processing to be used in systems utilizing computer generated graphics objects comprising the steps of:

defining plural sound sources, each sound source attached to a computer generated graphics object;

determining relative position between each computer generated graphics object with an attached sound source and a listener position;

mixing the sound sources into channels of multi-channel sound dependent upon relative position;

detecting changes in the relative position between each computer generated graphics object with an attached sound source and the listener position;

re-mixing the sound source into channels of multi-channel sound dependent upon the detected changes in relative position; and turning on a sound source responsive to user input.

5. A method of sound processing to be used in systems utilizing computer generated graphics objects comprising the steps of:

defining plural sound sources, each sound source attached to a computer generated graphics object;

determining relative position between each computer generated graphics object with an attached sound source and a listener position;

mixing the sound sources into channels of multi-channel sound dependent upon relative position;

detecting changes in the relative position between each computer generated graphics object with an attached sound source and the listener position;

re-mixing the sound source into channels of multi-channel sound dependent upon the detected changes in relative position; and turning off a sound source responsive to user input.

* * * * *